UNITED STATES PATENT OFFICE.

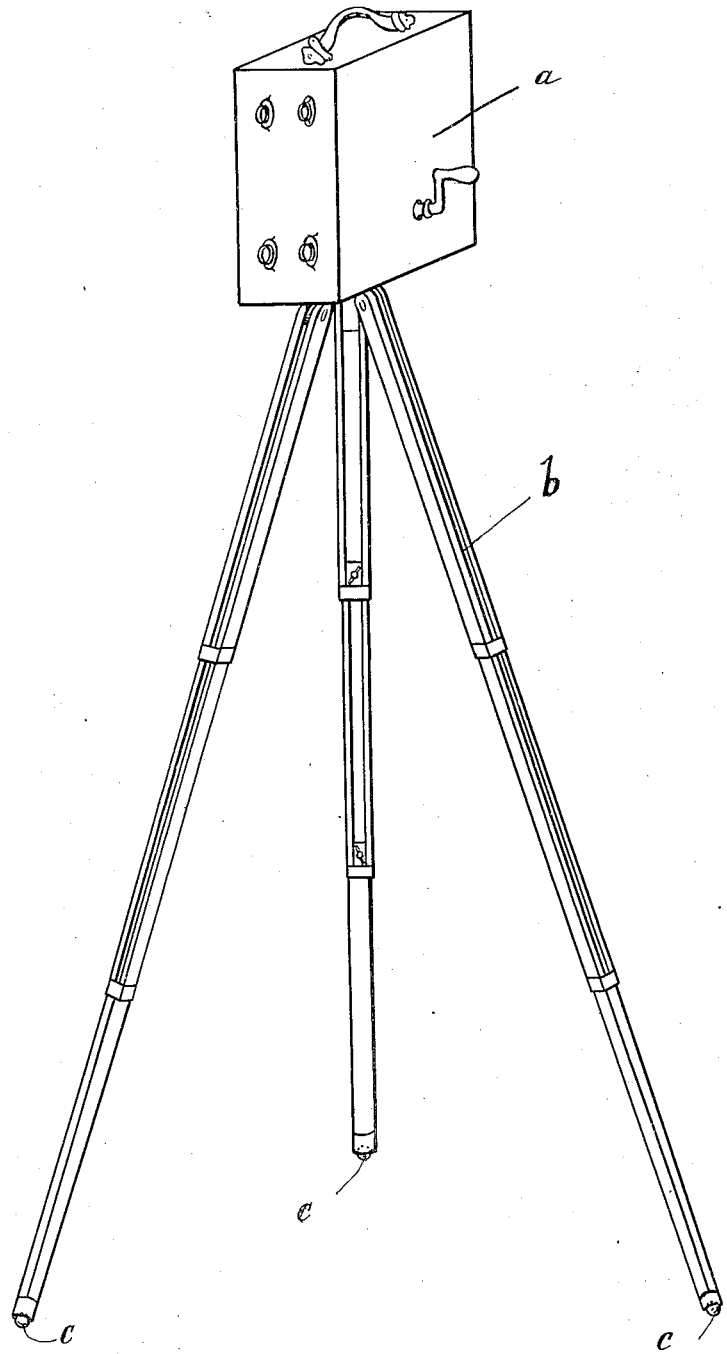

CARLO SCIAMENGO, OF TURIN, ITALY.

METHOD FOR TAKING KINEMATOGRAPHIC PICTURES.

1,102,172.　　　　Specification of Letters Patent.　Patented June 30, 1914.

Application filed October 16, 1912. Serial No. 726,157.

*To all whom it may concern:*

Be it known that I, CARLO SCIAMENGO, subject of the King of Italy, residing at Turin, Italy, have invented certain new and useful Improvements in Methods for Taking Kinematographic Pictures, of which the following is a specification.

This invention relates to an improved method for taking kinematographic pictures.

It has been proposed for taking kinematographic films which when projected on the screen give a certain appearance of relief to constantly displace the point from which the view is taken, either by alternately opening two objectives with which the camera is provided, or by giving the camera continuous movement on its support. But by reason of the complicated mechanism necessitated by such method the desired object is not attained by reason of the small amount of displacement available and further by having to resort to frequent and alternate displacements one would have at the time of projection a disagreeable effect of balance.

According to the present invention the method of taking the scene from different points of view consists in using a kinematographic camera fixed on its support while providing means whereby the support can be easily displaced during the operation of taking the views. This is effected by providing the legs of the support or stand with balls or wheels instead of the points with which the supports or tripods are provided and which rest on the ground, said balls being capable of allowing a sufficiently easy movement.

The annexed drawing illustrates the apparatus wherein—

—*a*— indicates the camera, —*b*— the stand or tripod, and —*c*—the balls on which the stand rests. The support may have any desired form and can be displaced by hand or mechanically.

When taking the views the operator can displace the apparatus gradually, but for considerable amounts in accordance with the conditions of the scene, so as to successively show the objects from different points of view which is sufficient to give at the time of projection an impression of relief which remains even for successive portions of the scene which might have been taken from a single point of view, by reason of the facility with which the eye retains the impression of relief once notice has been taken of the apparent solidity of the object observed. Consequently by this method very good results can be obtained with very simple means more especially because the operator is provided with means for effecting a marked displacement of the taking point at suitable moments and for putting the apparatus in the best place according to the particular conditions of the scene being photographed. As the successive pictures of the scene are being continuously taken from different points of view, the camera is gradually moved, always, of course, pointing toward the scene, the optical axis of the camera thus always being at an angle to the line of movement of the camera-support.

What I claim as my invention and desire to secure by U. S. Letters Patent is:—

1. The method of taking kinematographic pictures, which consists in taking the pictures while moving the camera mounted on a movable support in a line the direction of which at any moment is at an angle to the the optical axis of the camera at that moment, whereby there results at the time of projection an impression of relief.

2. The method of taking kinematographic pictures, which consists in taking the pictures while moving the camera mounted on a movable support in a line the direction of which at any moment is at an angle to the optical axis of the camera at that moment, whereby there results at the time of projection an impression of relief, the movement being to such successive points of view as shall accord with the conditions of the scene.

In testimony whereof I affix my signature in presence of two witnesses.

CARLO SCIAMENGO.

Witnesses:
　CARLO TORBAY,
　JOCELYN SOUBEYRAN.